July 9, 1963
R. T. BURNETT
3,096,856
"S" CAM BRAKE WITH SEGMENTED CAM FOLLOWER
Filed Nov. 19, 1959
4 Sheets-Sheet 4
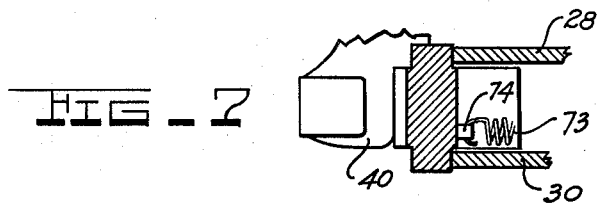
FIG_7
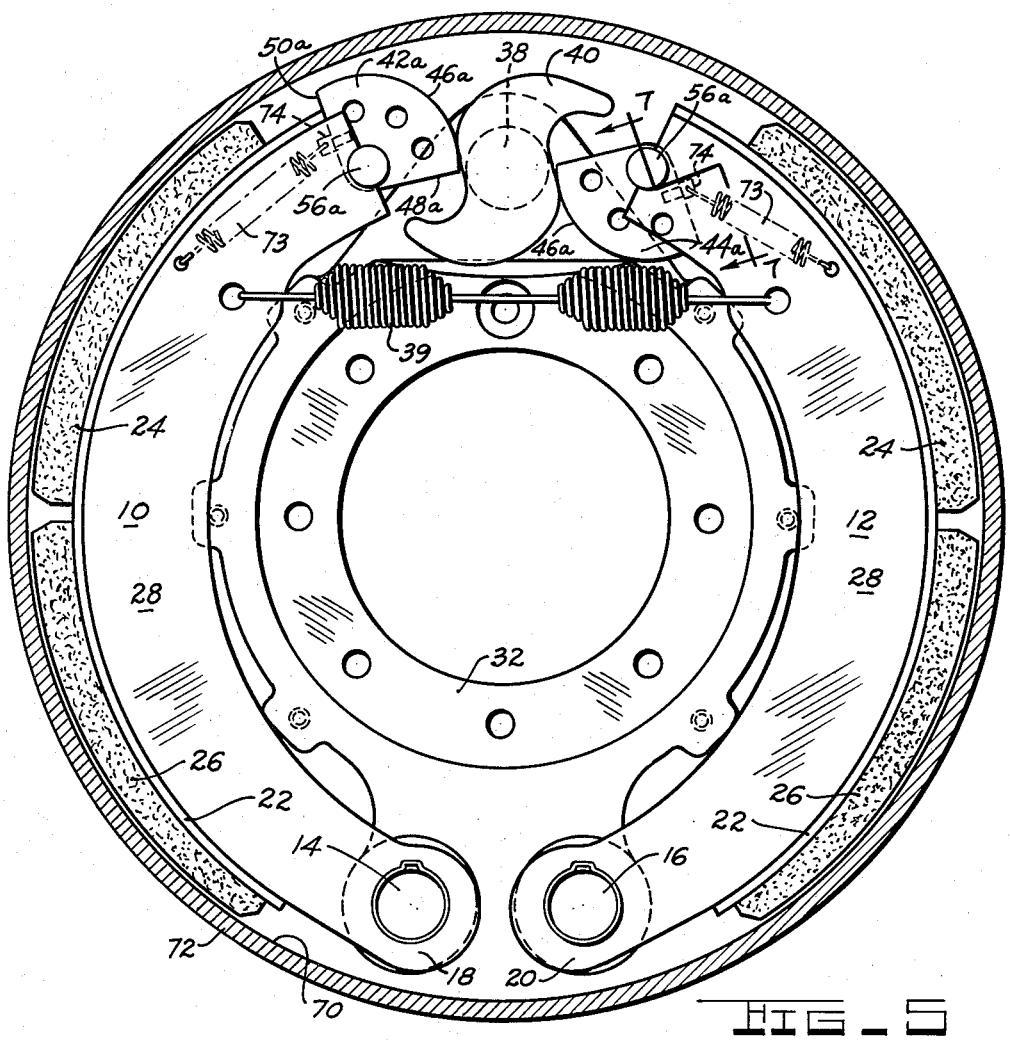
FIG_5
INVENTOR.
RICHARD T. BURNETT.
BY John A. Young
ATTORNEY.

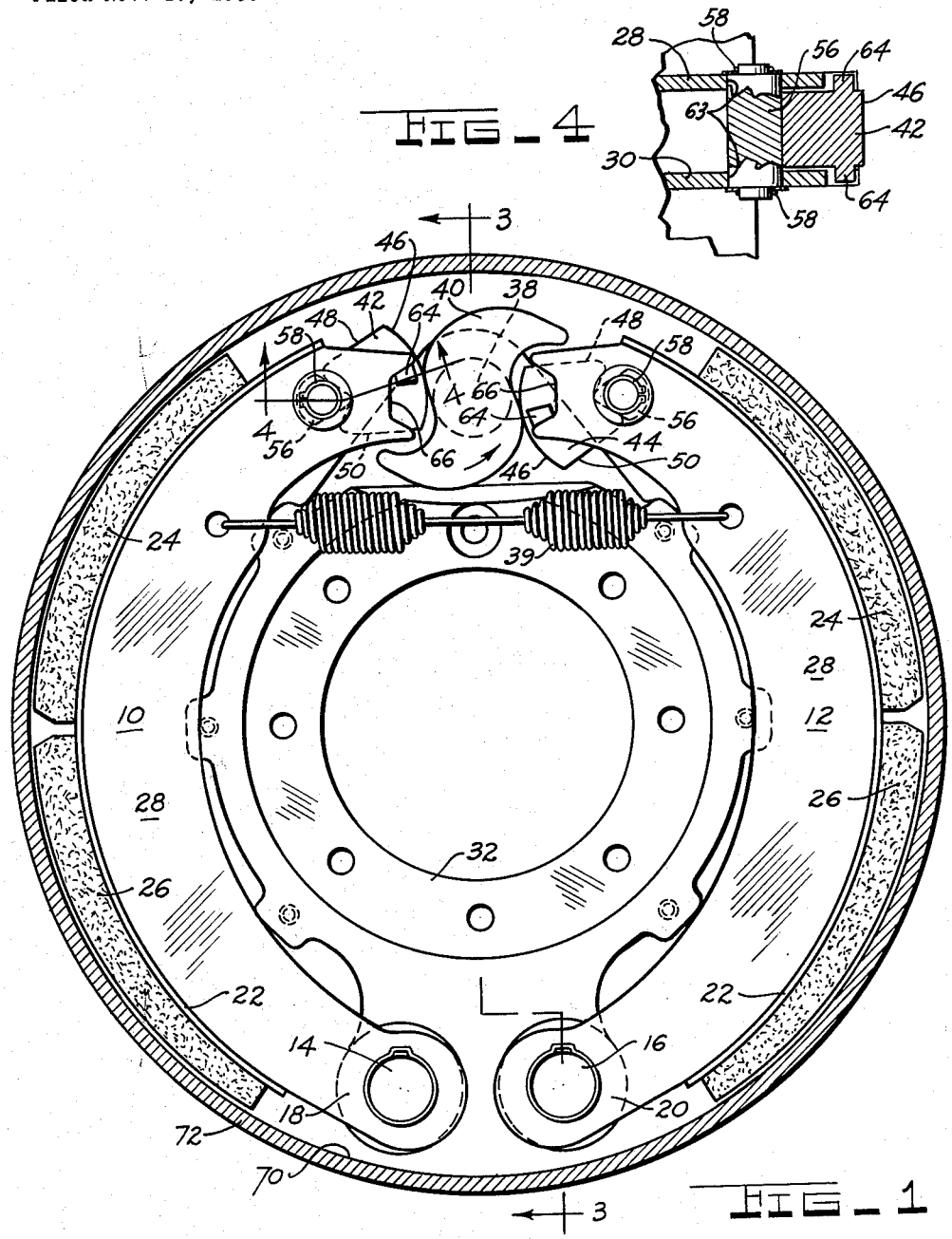

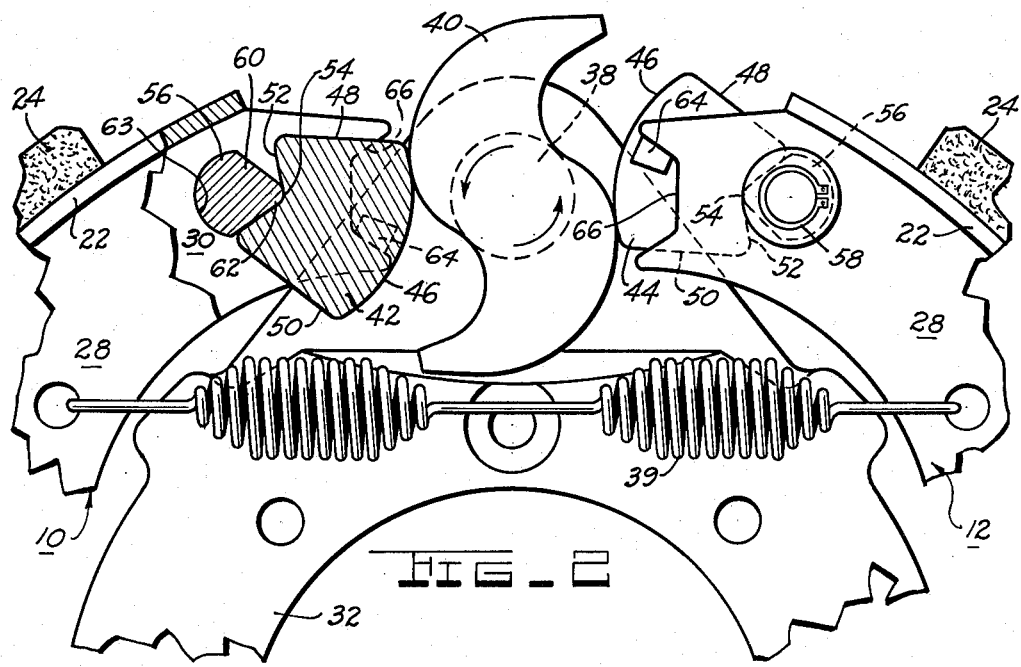
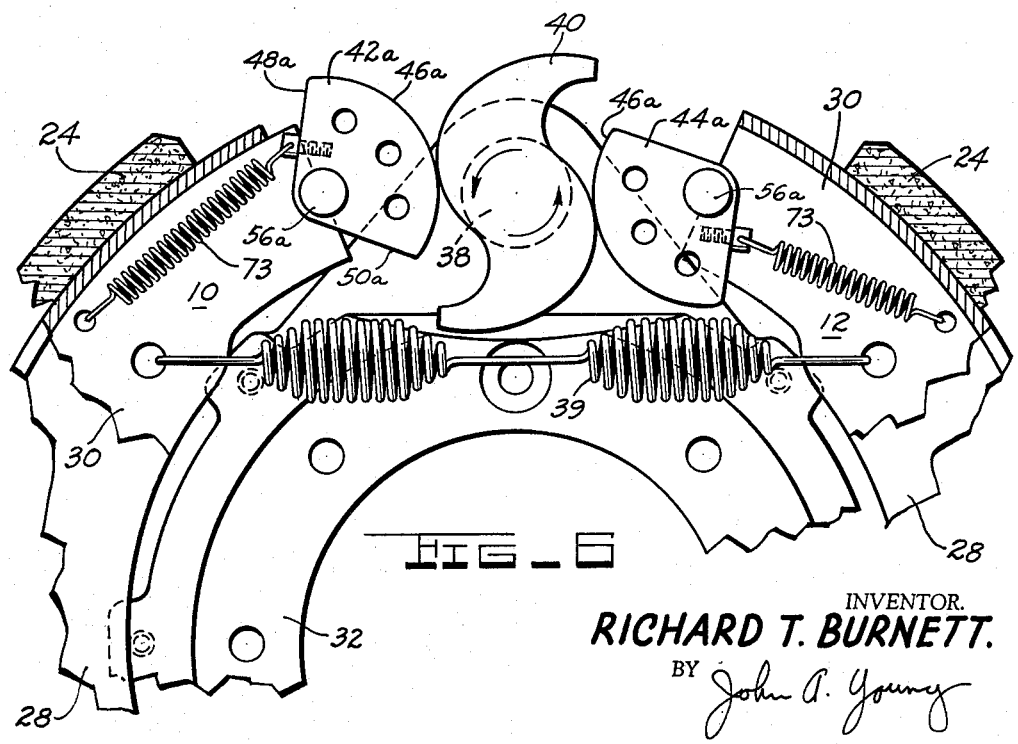

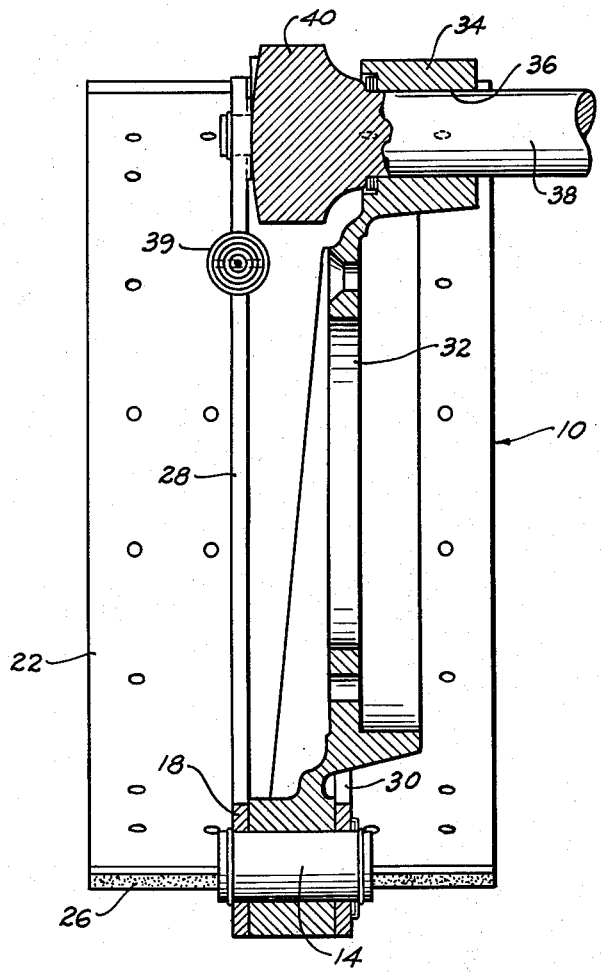

United States Patent Office 3,096,856
Patented July 9, 1963

3,096,856
"S" CAM BRAKE WITH SEGMENTED
CAM FOLLOWER
Richard T. Burnett, South Bend, Ind., assignor to The
Bendix Corporation, a corporation of Delaware
Filed Nov. 19, 1959, Ser. No. 854,145
5 Claims. (Cl. 188—78)

This invention relates to brakes of the internally expanding shoe type and more particularly to mechanically actuated brakes which are operated by means of an S cam construction.

It is not uncommon in mechanically actuated brakes of the S cam construction, that 20% and more of the applying force is lost in the applying linkage between the S cam and the brake shoes. This loss detracts appreciably from the brake efficiency.

Another serious shortcoming of the presently used mechanically actuated S cambrakes is that the fraction of the input effort which is lost at the actuator in the process of applying the brakes, also resists release of the brakes when the applying effort is relieved. This seriously impairs controllability of the brake and leads to excessive wear rate of the brake.

It is characteristic of the S cam actuator that its radius of action varies with different angular positions so that frictional losses in the actuator will tend to increase as the S cam is rotated through greater amounts as the lining wears. Frictional losses in the actuator can be reasonably expected to double during the wear life of the brake owing to these new positions of the cam; for example, initial losses in the order of 20% of the useful applying effort can increase to about 40% loss.

It is therefore an object of the present invention to provide a novel cam follower means in combination with an S cam actuator which will minimize frictional losses in the applying effort which is developed by the S cam and communicated to the brake shoes.

It is a further object of the invention to so reduce the order of frictional resistance of the cam follower that with an increase of radius of action of the S cam, inevitable friction losses will be kept to an acceptable minimum.

It is a further object of the present invention to provide cam follower means in combination with an S cam actuator which is relatively simple in construction and yet durable to withstand the applying loads which are communicated from the S cam to the brake shoes through said cam followers.

One important feature of the invention is that means may be provided to limit the angular movement of the cam followers so that in those instances where a particularly severe brake application is needed, the normal rolling action between the cam follower and the S cam changes to a sliding action between the two contacting surfaces.

Other objects and features of the present invention will become apparent from a consideration of the following description which proceeds with reference to the accompanying drawings, wherein a plurality of embodiments of the invention are illustrated by way of example.

In the drawings:

FIGURE 1 is a side elevation view of a brake having the present invention incorporated therein, the S cam being in its brake released position when the lining is not as yet worn;

FIGURE 2 is an enlarged detail view of the actuator and actuated ends of the shoe shown in FIGURE 1, the S cam being rotated in a counterclockwise direction and the cam followers being at the limits of their angular movement;

FIGURE 3 is a sectional view taken on line 3—3 of FIGURE 1;

FIGURE 4 is a sectional view taken on line 4—4 of FIGURE 1 through the cam follower and its connection with the brake shoe;

FIGURE 5 is a side elevation view of a second embodiment of the invention showing the S cam and cam followers in the brake released position which they assume when the lining is new;

FIGURE 6 is an enlarged detail view of the actuator and actuated ends of the shoes shown in FIGURE 5, the S cam being rotated to a brake applying position and the cam followers in a different angular position wherein the lining is applied; and FIGURE 7 is a fragmentary sectional view taken on line 7—7 of FIGURE 5 and showing the connection between the cam follower and brake shoe.

Referring now to the first embodiment shown in FIGURES 1 to 4, a pair of identically constructed brake shoes 10 and 12 are mounted for pivotal movement on fixed anchors 14 and 16 at their anchored ends 18 and 20.

Each brake shoe comprises an arcuate rim 22 having friction material segments 24 and 26 which are bonded, riveted or secured in some suitable manner to the outer surface of the rim. Each rim 22 has two spaced transverse strengthening webs 28 and 30 (FIGURES 3, 4). The two brake shoes 10 and 12 are carried on a support plate 32 which has an enlarged boss 34 with an opening 36 for a rotatable camshaft 38 having an S cam 40 at the end of the shaft 38. In released position the shoes are held retracted by a spring 39 fastened in tension between the actuated ends of the shoes.

Two cam followers 42 and 44 are located one on each side of the S cam and each has an arcuate face 46 in rolling engagement with its opposed surface of cam 40. The arcuate faces 46 are formed as segments of a circumference having a radius such that a full circumference roller of this radius would be prohibitively large and would cause interference with turning of the S cam.

Referring to FIGURE 2, the sides 48 and 50 of the cam follower are tapered and terminate at a recess 52 which provides at its base 54 a bearing surface having a radius which is substantially less than the radius of arcuate surface 46, the ratio of the radii of the two surfaces being in the order of 12½ to 1.

A pin 56 (FIGURES 1, 2, 4) is mounted perpendicularly in the two webs 28 and 30 at each of the actuated shoe ends and is held at its opposite ends by snap washers 58. From the cross section of the pin 56 (FIGURE 2) it will be seen that it is semicircular at one side and wedge-shaped at side 60 to extend within recess 52, the end 62 being rounded and of the same radius as bearing surface 54 to provide a relatively small pivot for angular movement of the follower. The companion openings 63 in the shoe webs prevent turning of the pins 56.

The end 62 thus provides a pivot point which while being relatively small and approaching a "knife edge" is yet sufficiently strong to resist the high orders of applying loads which are transmitted from the S cam 40 to the brake shoes through the intermediary of the cam follower and pin 56.

Two transverse lugs 64 on each cam follower are located within notches 66 in the webs 28 and 30 to engage the sides of the notch and thereby fix the limits of angular movement of the cam follower.

During brake release the return spring 39 which is stretched between the two shoes holds the arcuate surfaces 46 of the cam followers firmly against the opposing surfaces of the S cam.

To actuate the brake, the camshaft 38 is rotated counterclockwise (FIGURE 2) and the cam followers 42 and 44 are moved angularly clockwise through their rolling contact between the arcuate surfaces 46 and the opposed surfaces of S cam 40. Simultaneously with this angular movement, the cam followers 42, 44 are forced apart and this spreading force on the two cam followers is communicated to the brake shoes through the pins 56 to pivot the two shoes 10, 12 on their anchors 14 and 16, thereby engaging the lining segments 24, 26 of each brake shoe with the opposed cylindrical surface 70 of brake drum 72.

One of the reasons which accounts for a reduction of frictional losses at the actuator is the relatively large radius of arcuate surface 46 as compared with the radius of curvature of bearing surface 54 and engaging pin 56, i.e., the frictional resistance to pivotal movement at the pivot 62 is very easily overcome by reason of the much larger radius of arcuate surface 46; but to obtain this favorable ratio of radii, it is not possible to use the full circumference roller surfaces previously employed because of resulting interference with actuation of the S cam and also because a circular pin of sufficiently small dimension would lack necessary strength in resisting loads applied from the S cam to the brake shoe. The construction which has been described has been shown in one test to have approximately 22.8% to 23.5% increase in mechanical efficiency over previously used constructions. This is substantiated from the following results which were run as parallel tests, the first braking test being with a roller type construction having a radii ratio of about 1⅔ to 1. The tests are summarized as follows:

| Cam Shaft Torque in Pounds | Brake Having Rollers of 1⅔ to 1 Ratio In Place of Cam Followers | Brake With Cam Followers |
| --- | --- | --- |
| 1,600 | 11,000 | 16,500 |
| 2,300 | 18,000 | 24,250 |
| 3,100 | 27,000 | 33,250 |
| 4,000 | 33,750 | 41,000 |
| 4,800 | 41,000 | 48,500 |
| 5,500 | 47,750 | 57,000 |

It can be seen that the developed torque, i.e. torque developed by the brake with the same camshaft or input torque, is 23.5% higher with the present invention and this is attributed to the fact that the camshaft torque is not dissipated by frictional losses to the same extent as is the case with the conventional roller type actuation.

A further important consideration is that the frictional loss of 23.5% which occurs with the roller constructions can be expected to double toward the end of the wear life of the lining when the S cam has moved with its trailing edge being brought into contact with the cam follower. Owing to the cam configuration increase of friction can be expected to double and therefore the 23.5% friction loss figure will double. Since the present invention reduces friction to a low initial level, its doubling will still amount to substantially less significant applying effort loss at the end of the lining life.

During very severe brake applications, if the lugs 64 should contact the sides of the notch to limit further angular movement, the S cam is free to continue movement by sliding instead of rolling on surface 46; but whatever angular movement the S cam undergoes, whether it be through rolling or sliding contact with the surface 46, it will return the cam follower angularly by a proportional amount so that the lug is always moved away from its stop following each brake application.

Referring next to the embodiment shown in FIGURES 5 to 7, parts corresponding to those previously described will be referred to by the same reference numeral but include the subscript "a." Parts identical to those in the prior embodiment will receive the same reference numeral.

Cam followers 42a and 44a have arcuate surfaces 46a which are sectors of a circumference and are in rolling contact with the opposed engaging surfaces of an S cam 40. Sides 48a and 50a define the end portions of the followers 42a and 44a. The two cam followers 42a, 44a are connected with the actuatable ends of the shoes 10 and 12 by means of circular cross section posts 56a which are held at their opposite ends by webs 28 and 30 of the respective shoes and are formed integrally with followers 42a, 44a. The two cam followers are held normally in the angular position shown in FIGURE 5 while the brake is released, by means of springs 73 which are stretched between the web 28 of each shoe and bolt 74 fastened to the cam follower.

The radius of the arcuate surface 46a is substantially larger than the radius of circular cross section post 56a which provides a center of pivotal or angular movement of the cam followers 42a, 44a; and, a favorably large ratio of these two radii is obtained by means of forming the surface 46a as the sector of a circular surface rather than a complete roller member. The ratio of these two radii may be made sufficiently large in the embodiment shown in FIGURES 5 to 7 to obtain substantial benefits of the invention although best results are obtained with the previously described embodiment.

The brake is actuated by S cam 40 which is rotated by a camshaft (not shown). Rolling contact between the S cam and surfaces 46a produces angular movement of the cam followers 42a, 44a and a concurrent spreading apart of the two cam followers to force the ends of the shoes apart, pivoting them on their anchors 14, 16 and thereby engaging friction material lining segments 24, 26 of each shoe with the opposing cylindrical surface 70 of the rotatable drum 72. Angular movement of the cam followers is effected against the resistance of springs 73 so that when the brake is released, and the shoes are retracted by return springs 39, the cam followers 42a, 44a will be swung to their original angular position by the springs 73. Cam follower 42a is pulled by the spring 73 to a position wherein it engages the rim 22 of shoe 10 and the follower 44a is pulled by its spring 72 until the line of spring force passes through the center of its rotaion on post 56a. There is no limit of movement clockwise since the rolling surfaces provided by arcuate face 46a is more than sufficient for entire life of lining segments 24, 26. Since no substantial resistance is offered by the cam followers to their operation, the cam followers will quickly respond to permit release of the brake, thereby making for a much more controllable braking action.

Although only two selected embodiments of the invention have been illustrated for purposes of example, it will be appreciated that those skilled in the art can make modifications and revisions of the invention as suit individual requirements. It is intended, therefore, that such revisions and variations as incorporate the herein disclosed principles of the invention will be included within the scope of the following claims as equivalents of the invention.

What is claimed is:

1. A brake comprising a rotatable drum, two arcuate brake shoes each having a friction material lined rim and a transverse strengthening web, a return spring stretched between adjacent actuatable ends of said shoes to effect retraction thereof, an S cam disposed between the adjacent actuatable ends of said shoes for spreading the two shoes apart and applying the shoes frictionally against said drum, a cam follower between each of said shoes and said S cam and having an arcuate outer face in rolling engagement with said S cam and movable outwardly thereby, means forming a V-shaped recess in each of said cam followers and providing at the innermost end thereof an arcuate bearing surface of substantially less radius than that of said arcuate outer face, force transmitting means connected with each of said shoes and of complementary curvature in relation to said bearing surface of said followers engaging with a respective arcuate bearing surface of one of said cam followers to transmit spreading force to the brake shoes, and abutment means forming a part of each of said cam followers and disposed within a notch in a respective one of said shoes to limit pivotal movement of said cam followers.

2. A brake comprising a rotatable drum, two brake shoes anchored at one pair of adjacent ends and actuatable at the other pair of adjacent ends, each of said shoes having a friction material lined rim and a transverse strengthening web, a notch constructed in each of the webs of the shoes formed along the width of the shoe web at the actuated shoe ends, an S cam actuator disposed between said adjacent actuated ends of said shoes, two cam followers each having an arcuate face in rolling engagement with respective opposite sides of said S cam and movable apart by said S cam, a lug constructed integrally with said followers and received in a respective notch in said shoe web to limit angular movement of said followers, a recess having an arcuate abutment surface on each of said cam followers of substantially less radius than its respective arcuate face in rolling contact with said S cam, and force transmitting means connected to each of said shoes and having tapered portions extending within said recesses to be in engagement with the abutment surface of its coacting cam follower and provide a center of pivotal movement of the cam follower as the cam followers apply outward thrust from the S cam to said shoes, each said lug being movable into engagement with the spaced sides of said notches to define fixed limits of angular movement of the respective followers.

3. A brake comprising a rotatable drum, two arcuate brake shoes mounted within said drum and each having a friction material lined rim and a transverse strengthening web, a return spring connected to adjacent actuatable ends of said shoes to effect retraction thereof, an S cam disposed between the adjacent actuatable ends of said shoes for spreading the two shoes apart and applying the shoes frictionally against said drum, a rotatable camshaft for turning said S cam, a cam follower between each of said shoes and S cam and having an arcuate incomplete circular outer face in rolling engagement with said S cam and movable outwardly thereby, each of said cam followers having a recessed portion providing an inner arcuate bearing surface of substantially less radius than that of said arcuate outer face, force transmitting means connected with each of said shoes and having tapering sides projecting within the recessed portion of a respective one of said cam followers decreasing in width as they project therewithin to provide an abutment engaging its coacting bearing surface for pivotal movement thereon, and means forming a part of each of said cam followers and disposed within a notch in a respective one of said shoes to limit pivotal movement of said cam follower.

4. A brake comprising a shoe anchored at one end and actuatable at the other end, said shoe having a friction material lined rim and a transverse strengthening web, a notch constructed in the web of the shoe formed along the width of the shoe web at the actuated shoe end, an S cam actuator disposed at the actuated end of said shoe, a cam follower having an outer arcuate face in rolling engagement with said S cam and movable by said S cam, a lug constructed integrally with said follower and received in said notch in said shoe web to limit angular movement of said follower, a recess at the inner end of said cam follower having an arcuate abutment surface of substantially less radius than its respective outer arcuate face, and force transmitting means connected to said shoe and having a tapered portion extending within said recess to be in engagement with the abutment surface of its coacting cam follower and provide a center of pivotal movement of the cam follower as the cam follower applies outward thrust from the S cam to said shoe, said lug being movable into engagement with the spaced sides of said notch to define fixed limits of angular movement of said follower.

5. A brake comprising a shoe anchored at one end and actuatable at the other end, said shoe having a friction material lined rim and a transverse strengthetning web, a notch constructed in the web of the shoe formed along the width of the shoe web at the actuated shoe and, an S cam actuator disposed at the actuated end of said shoe, a cam follower having an outer arcuate face in rolling engagement with said S cam and movable by said S cam, a lug constructed integrally with said follower and received in said notch in said shoe web to limit angular movement of said follower, a recess at the inner end of said cam follower having an arcuate abutment surface of substantially less radius than its respective outer arcuate face, and force transmitting means connected to said shoe and having a tapered portion terminating at a curved surface which is complementary with the arcuate abutment surface of said cam follower and extending within said recess to be in engagement with said arcuate abutment surface and provide a center of pivotal movement of the cam follower as the cam follower applies outward thrust from the S cam to said shoe, said lug being movable into engagement with the spaced sides of said notch to define fixed limits of angular movement of said follower.

References Cited in the file of this patent

UNITED STATES PATENTS

| | | |
|---|---|---|
| 1,746,017 | Smith | Feb. 4, 1930 |
| 1,808,206 | Chase | June 2, 1931 |
| 1,962,658 | Huck | June 12, 1934 |
| 2,351,114 | Freeman | June 13, 1944 |
| 2,508,557 | Wood | May 23, 1950 |
| 2,928,510 | Kay | Mar. 15, 1960 |

OTHER REFERENCES

Compagnie d'Applications, 228, 154, Mecaniques (United Kingdom), March 25, 1926.